Oct. 7, 1941.   E. F. KOHL   2,258,157
CLUTCH
Filed Nov. 22, 1939   2 Sheets-Sheet 1

INVENTOR
EVERARD F. KOHL
BY Hyde and Meyer
ATTORNEYS

Oct. 7, 1941.     E. F. KOHL     2,258,157
CLUTCH
Filed Nov. 22, 1939     2 Sheets-Sheet 2

INVENTOR
EVERARD F. KOHL
BY Hyde and Meyer
ATTORNEYS

Patented Oct. 7, 1941

2,258,157

UNITED STATES PATENT OFFICE 2,258,157

CLUTCH

Everard F. Kohl, Cleveland, Ohio

Application November 22, 1939, Serial No. 305,627

21 Claims. (Cl. 192—105)

My invention relates to clutches and more particularly to a clutch of the liquid actuated type.

In Patent No. 1,972,741 granted to me on September 4, 1934, a liquid type clutch is disclosed which permits the driving means to come up to speed without load and which also protects the driving means against overloads.

It is the aim of the present invention to provide an improved clutch structure of the liquid actuated type having driving and driven members, and a plurality of clutch members formed of a dense, light material in which the clutch members are forced into driving engagement with the driven member by the buoyant effect of the liquid, which buoyant effect is accentuated in multiple amounts as the rotative speed of the clutch members increases.

According to my invention the clutch members are driven by a drum or housing which does not depend for its action upon members or projections extending into the liquid and in which small amounts of liquid may be utilized for effecting comparatively great pressures. Improved means may also be provided for varying the capacity of the clutch.

My invention also contemplates an improved clutch structure which is effective in providing a driving engagement between the driving member and the member to be driven while permitting misalinement of the driven member. This misalinement may be angular or parallel, or both, and may be small or pronounced. My improved clutch is also characterized by the fact that the driven member may be rotated independently of the driving member. In other words, an irreversible clutch is provided in which the driving member is effective in driving the driven member but the driven member cannot be utilized for driving the driving member.

It is therefore an object of my invention to provide an improved liquid actuated clutch by means of which a small amount of liquid is effective in producing a comparatively great pressure.

Another object is to provide an improved liquid actuated clutch in which the driven member may be rotated independently of the driving member.

A further object is to provide a clutch actuated by liquid pressure in which improved means are provided for preventing the escape of the liquid from the clutch housing.

Another object of my invention is to provide a liquid actuated clutch structure having segmental clutch members in which improved means are provided for rotating the clutch members.

A further object is to provide a liquid actuated clutch structure having segmental clutch members in which improved means are provided for rotating the segmental members with the driving member and which means are also effective in mechanically increasing the force for moving the segmental members into engagement with the clutch surface of a driven member during the rotation of the driving member.

Another object of my invention is to provide an improved clutch structure of the liquid actuated type in which a driving engagement is effected between the driving member and the member to be driven while permitting misalinement of the driven member.

Another object of my invention is to provide an improved clutch structure of the liquid actuated type in which means are provided for varying the capacity of the clutch.

A still further object of my invention is to provide a clutch structure of the liquid actuated type in which means are provided for delaying the engagement of the driving member and the member to be driven until the driving member attains the desired speed.

Other objects and advantages of my invention will be apparent as the specification proceeds.

My invention will be better understood by reference to the accompanying drawings in which—

Figure 1:
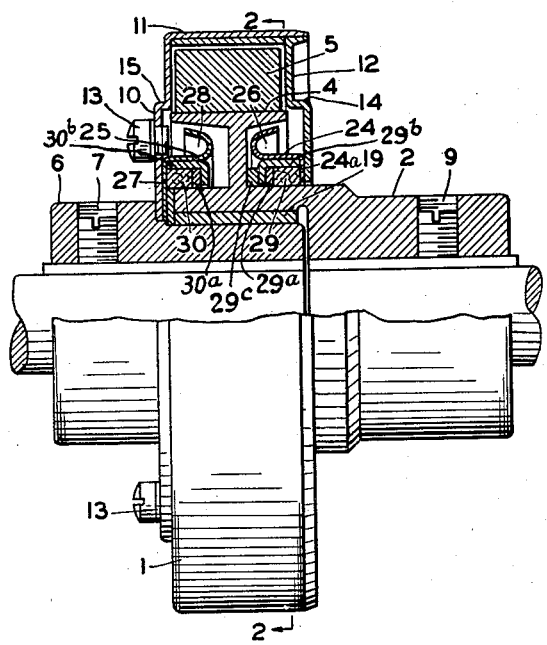
Fig. 1 is a composite view of one form of a clutch embodying my invention, the lower part of the view being a side elevation and the upper part being a central longitudinal section.
Figure 2:
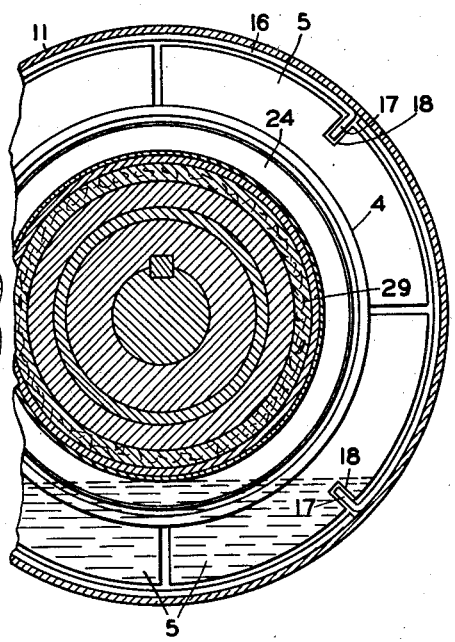
Fig. 2 is a cross sectional view on the line 2—2 of Fig. 1 with parts broken away.
Figure 9:
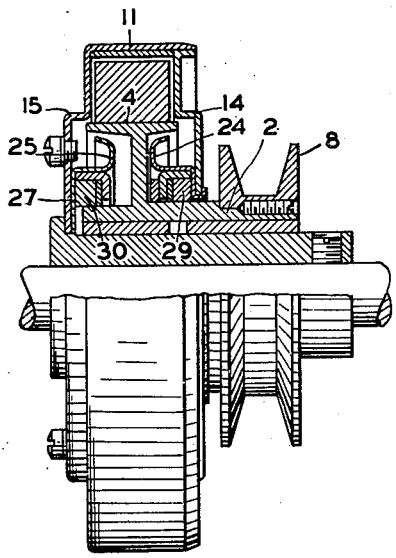
Fig. 9 is a view similar to Fig. 1 showing a pulley attached to the member to be driven.
Figure 8:
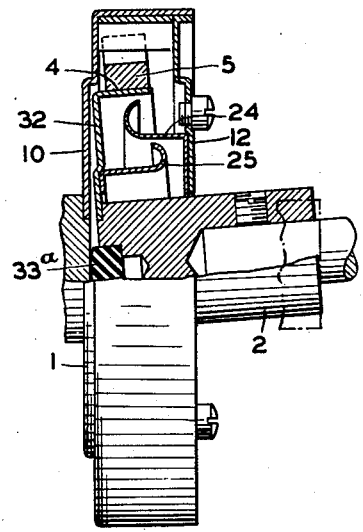
Fig. 8 is a view similar to Fig. 5 showing the driven shaft in a misalined position.

Referring to the drawings, one form of my improved clutch is shown in Figs. 1, 2 and 9. The clutch as illustrated is comparatively light in weight and is capable of effecting comparatively great pressures with a small amount of liquid and as illustrated, comprises a driving member including a rotatable housing designated generally by the numeral 1 containing a suitable liquid, a driven member 2 arranged approximately coaxial with the driving member, one end of which extends into the housing and is provided with an annular flange, forming a continuous clutch surface 4, and a plurality of segmental members 5 disposed between the clutch surface 4 and the interior periphery of the housing. As illustrated, one side of the housing is provided with an opening to receive one end of a shouldered hub 6 which is adapted to receive the shaft of a prime mover, such as an electric motor, and to the shoulder of which the housing may be suitably secured, such as by welding. The shaft of the prime mover may be secured to the hub by any suitable means, such as a set screw threaded through the aperture 7.

The driven member 2 may be of any desirable form. For instance, it may be the driving shaft of a suitable member to be driven, such as a pulley 8 as shown in Fig. 9 of the drawings, or it may be in the form of a hub 2 as shown in Fig. 1 to which a shaft to be driven may be secured, such as by means of a set screw threaded through the aperture 9, and as illustrated, extends loosely through an opening in the housing to permit a slight misalinement of the driven member. This slight misalinement may be effected by mounting the driven member loosely upon its bearings or the slight misalinement may develop in service by wear upon the bearing.

While the housing may be formed in any desirable manner, as shown in the drawings, the side 10 and the peripheral portion 11 are formed of a stamping or casting to which the cover portion 12 is secured by any suitable means such as welding, and the side 10 is provided with openings adapted to be closed by threaded plugs 13 through which the liquid may be inserted in the housing.

Although any suitable liquid may be employed which has a higher specific gravity than the segmental members 5, I preferably utilize a liquid having a high specific gravity, such as mercury, because it has a high buoyant action and because of its weight the driving member may be brought to speed before its buoyant action becomes sufficiently effective to rotate the driven member. Mercury, however, is comparatively expensive at the present time and it is desirable to provide a structure in which great pressures may be effected when only a small quantity of mercury is employed. For this purpose the side walls 10 and 12 are provided with inwardly extending annular shoulders 14 and 15 and the annular clutch surface 4 extends substantially the entire distance between the shoulders, but is arranged below the shoulders in the enlarged portion of the clutch housing and its ends are spaced a sufficient distance from the side walls of the housing to permit a slight misalinement of the driven shaft. An annular peripheral chamber is thus provided to receive the segmental members 5 which are spaced apart and from the periphery of the housing a sufficient distance to permit radial movement but otherwise substantially fill the space between the periphery of the housing and the clutch surface 4.

The segmental members 5 must be formed of a material having a lower specific gravity than the liquid which is utilized and while any suitable material having such properties may be employed such as cork, wood, laminated material or the like, I preferably utilize a suitable molded material, such as asbestos fibers bound together by any suitable material, such as a phenolic condensation product.

According to my invention the segmental members 5 are driven by the housing and while any desirable means may be provided for this purpose, such as suitable projections extending inwardly from the housing, as shown in the drawings the housing 1 is provided with a lining 16 which consists of a plurality of arcuate members one end of each of which is provided with an inwardly extending flange 17 which is adapted to extend into a notch 18 formed in the outer periphery of each of the clutch members.

When the clutch is idle the mercury settles in the bottom of the housing as shown in Fig. 2 and as the driving member is brought up to speed the mercury is picked up by the inner periphery of the housing and by the outer peripheral portions of the clutch members 5 and as the speed of the driving member increases the mercury assumes the form of an annulus. The segmental members are also momentarily thrown outwardly toward the periphery of the housing by centrifugal force during the rotation of the housing but if sufficient mercury is placed in the housing this force will be overcome by the buoyant action of the mercury and the clutch members 5 will be forced radially inward into driving engagement with the clutch surface 4, thereby driving shaft 2 which rotates upon bearings 19 surrounding the reduced portion of the hub 6. As in my improved construction, the segmental clutch members 5 are driven by the housing and are at least partially submerged in the annular layer of mercury which is formed, it will be apparent that the buoyant force of a small amount of mercury is capable of effecting comparatively great pressures. It will also be apparent that when a particular type of clutch member is utilized, the capacity of the clutch may be regulated by the amount of mercury which is introduced into the housing up to the point at which complete immersion of the clutch members is effected and the speed at which the housing is driven. The quantity of mercury shown in Fig. 2 of the drawings is therefore merely illustrative. It will be noted that the clutch surface 4 is a continuous smooth surface and consequently the driven member may be rotated independently of the clutch members 5 and the housing. An irreversible clutch is thus provided.

Figure 3:
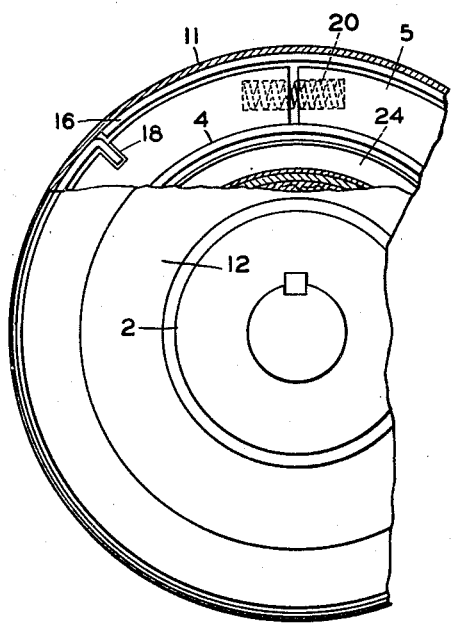
Fig. 3 is a side elevational view of a clutch housing similar to that shown in Fig. 1 with parts broken away to show the underlying clutch members and showing means for delaying the driving engagement between the clutch members and the member to be driven until the driving member attains a predetermined speed.

To prevent a too sudden application of the clutch members against the clutch surface or to vary the capacity of the clutch, resilient means such as springs 20, as illustrated in Fig. 3 of the drawings, may be interposed between the ends of the clutch members. Such means enables the driving member to come up to speed without load and also varies the capacity of the clutch because when such resilient means are utilized the buoyant effect of the mercury must not only overcome the centrifugal force of the clutch members but must also overcome the force of the springs. In the structure shown in Fig. 3, it is therefore apparent that the driven member may be rotated independently of the driving member when the driving member is at rest or even when the driving member is rotated at a speed which is insufficient to cause the liquid to buoyantly force the clutch members inwardly against the clutch surface of the driven member.

Figure 4:
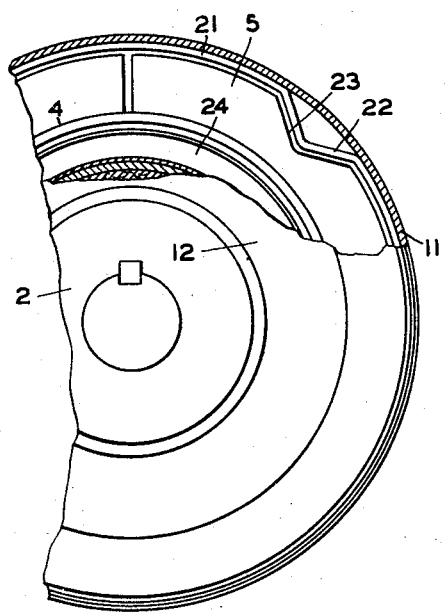
Fig. 4 is a view similar to Fig. 3 showing modified means for effecting engagement between the driving member and the clutch members.
Figure 5:
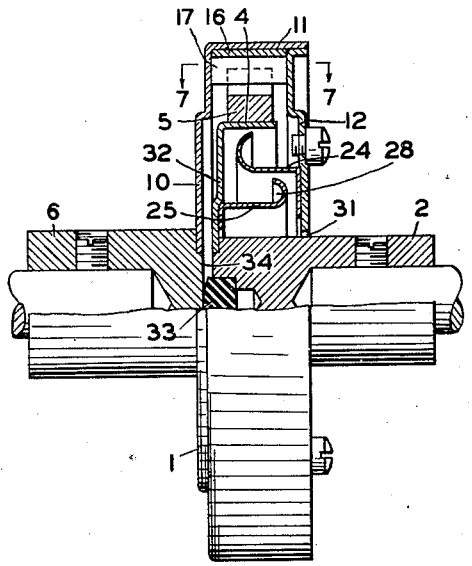
Fig. 5 is a view similar to Fig. 1, showing modified means for effecting engagement between the driving member and the clutch members to compensate for the misalinement of a member to be driven.
Figure 6:
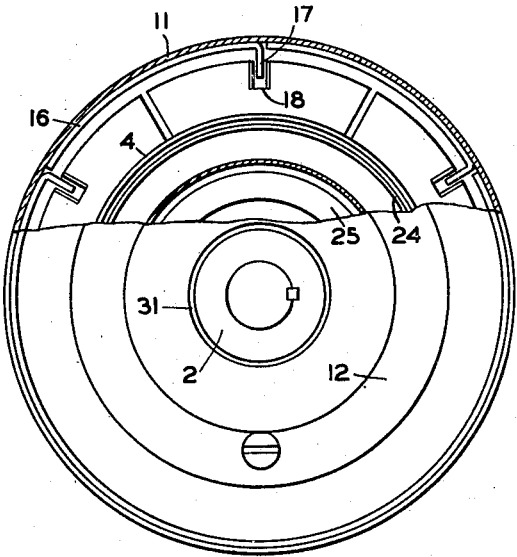
Fig. 6 is a side elevational view of the clutch housing shown in Fig. 5 with parts broken away to show a side elevational view of the connection between the driving member and the clutch members.

Mechanical means may also be provided for supplementing the buoyant effect of the mercury upon the clutch members. For this purpose the lining 21 is provided with angular indentations 22 as shown in Fig. 4, which fit into similar indentations 23 in the outer periphery of the clutch members. In this construction, as the housing is rotated the angular indentations on the lining of the housing rotate the clutch members and as the clutch members are forced radially inward by the buoyant effect of the mercury, the angular indentations 22 on the lining bear against the indentations on the clutch members and force the clutch members tightly against the clutch surface.

My improved clutch structure also includes means for draining the liquid from the periphery to the bottom of the housing as the driving member comes rest. Such means also prevent the mercury from leaking from the housing through the shaft openings therein and from coming in contact with the bearings. While any suitable means may be utilized for this purpose, as shown in the drawings a pair of annular shedders 24 and 25 are provided. As shown in Figs. 1 and 9 of the drawings, shedder 24 is provided with a flange 24a which is secured to the wall 12 of the housing by any suitable means such as welding and is provided with an annular pocket 26 arranged below one edge of clutch surface 4, and in a like manner shedder 25 is provided with a flange 27 secured to the wall 10 and an annular pocket 28 arranged below the opposite edge of the clutch surface.

Sealing means may be provided to prevent dirt or oil from entering the housing and the mercury from flowing into contact with the bearings. While any suitable sealing means may be employed, as shown in the drawings, a layer of felt 29 and a fibre washer 29a are held adjacent the hub 2 in proximity to the opening in cover 12 by means of an angle iron 29b, one flange of which is welded or otherwise secured to flange 24a of shedder 24 and the other flange of which is arranged adjacent the hub 2. A fibre washer 29c is also interposed between one flange of angle iron 29b and the flange of the member to be driven. To prevent the mercury or other liquid from flowing in contact with the bearings, a layer of felt 30 and a fibre washer 30a are maintained in position over hub 2 by means of an angle iron 30b, one flange of which is secured to the flange of shedder 25 and the other flange of which extends in proximity to hub 2. The fibre washers may be formed of any suitable material, such as asbestos fibres bound together by a phenolic condensation product.

Figure 7:
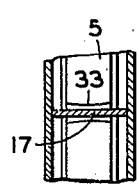
Fig. 7 is a cross sectional view on the line 7—7 of Fig. 5.

Although a slight misalinement of the driven shaft is permitted in the form of the invention shown in Figs. 1 and 2, a modified form of my improved clutch is shown in Figs. 5, 6, 7 and 8 in which a pronounced tilting movement of the driven shaft is permitted. In this form of clutch the hub 2 to which a shaft or pulley may be attached is inserted in the housing 1 through an opening 31 and is provided at its inner margin with a disk 32 provided with an annular flange to form the continuous clutch surface 4. The opening 31 is of sufficient size to permit misalinement of the shaft 2 and the notches formed in the outer periphery of the clutch members are arranged to permit movement of the clutch surface 4 when the driving lugs 17 are in the notches. For this purpose the notches are bevelled outwardly to the opposite edge of the clutch members from a central point 33 as shown in Fig. 7 of the drawings. The shaft 2 is also provided with a resilient plug 33a which rests against the inner wall 34 of hub 6 and provides a support or thrust bearing upon which the shaft 2 may be moved. In this form of clutch the shedding means are provided to prevent the mercury from draining through the opening 31 as the driving member comes to rest. For this purpose the shedder 24 is attached to the side wall 12 as in Fig. 1 of the drawings and shedder 25 has its pocket 28 extending under the shedder 24 to receive any liquid which splashes over shedder 24.

The clutch shown in Fig. 9 of the drawings is similar to that shown in Fig. 1 with the exception that the driving shaft and the shaft to be driven extend in the same direction and the shaft 2 is provided with a pulley 8 to be driven.

What I claim is:

1. A clutch comprising a driving member including a rotatable housing having a body of liquid therein, a driven member having a clutch surface arranged in said housing, a plurality of clutch members disposed between said clutch surface and the periphery of said housing, said clutch members having a lower specific gravity than said liquid and each being provided with a slot extending radially inward from its outer surface, and means associated with said housing and extending into said slots for rotating said clutch members during the rotation of said housing, the rotation of said driving member at a sufficient speed to centrifugally throw the liquid to the inner periphery of the housing being effective in causing said liquid to move said clutch members radially into engagement with said clutch surface with a force depending upon the rotative speed of said driving member and the depth to which the clutch members are immersed in said liquid.

2. A clutch comprising a rotatable driving member including an annular housing having a body of liquid therein, a driven member having an annular clutch surface arranged in said housing which is spaced from and substantially coextensive with the inner peripheral portion of said housing, a plurality of clutch members having a lower specific gravity than said liquid arranged between said clutch surface and the inner peripheral portion of said housing, said clutch members being radially movable between said clutch surface and the periphery of said housing but otherwise substantially filling said space, and means associated with said housing and clutch members for rotating said clutch members in unison with said housing, the rotation of said driving member at a sufficient speed to centrifugally throw the liquid to the inner periphery of the housing being effective in causing said liquid to move said clutch members radially into engagement with said clutch surface with a force depending upon the rotative speed of said driving member and the depth to which the clutch members are immersed in said liquid.

3. A clutch comprising a driving member including a rotatable housing having a body of liquid therein, a driven member having a clutch surface arranged in said housing, a plurality of clutch members having a lower specific gravity than said liquid disposed between the clutch surface of said driven member and the periphery of said housing, means associated with said clutch members and said housing for causing rotation of said clutch members with said housing while permitting radial movement of the clutch members, said clutch members being adapted to be forced radially inward into driving engagement with said clutch surface by the buoyant action of said liquid during the rotation of said housing, and means for preventing the inward movement of said clutch members until the driving member has attained a predetermined speed.

4. A clutch comprising a driving member including a rotatable housing having a body of liquid therein, a driven member having a clutch surface arranged within said housing, a plurality of clutch members having a lower specific gravity than said liquid disposed between the clutch surface of said driven member and the periphery of said housing, means associated with said clutch members and said housing for causing rotation of said clutch members with said housing while permitting radial movement of the clutch members, the buoyant action of said liquid being adapted upon rotation of said driving member to exert a radially inward force upon said clutch members to force them into driving engagement with said clutch surface, and resilient means associated with said clutch members for counteracting a portion of the buoyant force of said liquid, thereby limiting the capacity of said clutch.

5. A clutch comprising a driving member including a rotatable housing having a body of liquid therein, a driven member having a clutch surface arranged in said housing, a plurality of clutch members having a lower specific gravity than said liquid disposed between the clutch surface of said driven member and the periphery of said housing, and means associated with said housing and said clutch members for rotating said clutch members during the rotation of said housing, said clutch members being adapted to be forced radially inward into driving engagement with said clutch surface by the buoyant action of said liquid during the rotation of said housing, and the means for rotating said clutch member being shaped to mechanically increase the force with which the clutch members are moved inwardly.

6. A clutch comprising a driving member including a rotatable housing having a body of liquid therein, a driven member having a clutch surface arranged in said housing, a plurality of clutch members having a lower specific gravity than said liquid disposed between the clutch surface of said driven member and the periphery of said housing, each of said clutch members having an angular indentation extending inwardly from its outer surface, and angular means associated with said housing and extending into the angular indentations on the outer surface of said clutch members, said clutch members being adapted to be forced radially inward into driving engagement with said clutch surface by the buoyant action of said liquid during the rotation of said housing, and the angular means on said housing being effective in increasing the force with which the clutch members are moved inwardly.

7. A clutch comprising a driving member including a rotatable housing having a body of liquid therein, a driven member having an annular clutch surface arranged in said housing, a plurality of clutch members having a lower specific gravity than said liquid disposed between the clutch surface and the periphery of said housing, means associated with said clutch members and one of said members for causing rotation of said clutch members while permitting radial movement of said clutch members, said clutch members being adapted to be forced inward into driving engagement with said clutch surface by the buoyant action of said liquid which is thrown outwardly into an annular form by centrifugal action during the rotation of said housing, and shedding means arranged radially inwardly of said clutch surface for receiving the liquid and draining it to the bottom of said housing as the driving member comes to rest.

8. A clutch member comprising a driving member including a rotatable housing having a body of liquid therein, a driven member having a clutch surface arranged in said housing, a plurality of clutch members having a lower specific gravity than said liquid disposed between the clutch surface of said driving member and the periphery of said housing and being adapted to be forced radially inward by the buoyant action of said liquid during the rotation of said housing, and means associated with said clutch members and said housing for causing rotation of said clutch members with said housing while permitting radial movement of said clutch members, said means being constructed and arranged to permit misalinement of the axis of the driven member with respect to the axis of said housing.

9. A clutch member comprising a driving member including a rotatable housing having a body of liquid therein, a driven member having an end portion extending loosely through an opening in said housing, and provided with an annular clutch surface, a plurality of clutch members having lower specific gravity than said liquid disposed between the clutch surface of said driven member and the periphery of said housing and being adapted to be forced radially inward by the buoyant action of said liquid during the rotation of said housing, annular shedding means arranged radially inwardly of said clutch surface for receiving the liquid and draining it to the bottom of the housing as the driving member comes to rest, and means associated with said clutch members and said housing for causing rotation of said clutch members with said housing while permitting radial movement of said clutch members, said means being constructed and arranged to permit misalinement of the axis of the driven member with respect to the axis of said housing.

10. A clutch comprising a driving member including a rotatable housing containing a liquid, a driven member having a clutch surface arranged in said housing, a plurality of clutch members having a lower specific gravity than said liquid disposed between the clutch surface of said driven member and the inner periphery of said housing, means associated with said clutch members and said housing for causing rotation of said clutch members with said housing while permitting radial movement of the clutch members, the rotation of said driving members at a sufficient speed to centrifugally throw the liquid to the inner periphery of the housing being effective in causing said liquid to buoyantly move said clutch members radially into engagement with said clutch surface with a force depending upon the rotative speed of said driving member and the depth to which the clutch members are immersed in said liquid.

11. A clutch comprising a driving member including a rotatable housing containing a liquid, a driven member having a clutch surface arranged in said housing, a plurality of clutch members having a lower specific gravity than said liquid disposed between the clutch surface of said driven member and the periphery of said housing and being of such volume as to permit their radial movement but otherwise substantially filling the space between the clutch surface and the periphery of said housing, means associated with said clutch members and said housing for causing rotation of said clutch members with said housing while permitting radial movement of the clutch members, the rotation of said driving member at a sufficient speed to centrifugally force said liquid to the inner periphery of said housing being effective in causing said liquid to buoyantly move said clutch members radially into engagement with the clutch surface with a force depending upon the rotative speed of said driven member and the depth to which the clutch members are immersed in said liquid.

12. A clutch comprising a driving member including a rotatable housing containing a liquid, a driven member rotatable independently of said driving member when said housing is at rest and having a clutch surface arranged in said housing, and a plurality of radially movable clutch members having a lower specific gravity than said liquid arranged in said housing, the rotation of said driving member at a sufficient speed to centrifugally throw the liquid to the inner periphery of the housing being effective in causing said liquid to buoyantly move said clutch members radially into engagement with said clutch surface with a force dependent upon the rotative speed of said driving member and the depth to which the clutch members are immersed in said liquid.

13. A clutch comprising a driving member including a rotatable housing containing a liquid, a driven member rotatable independently of said driving member when said housing is at rest and having a comparatively smooth continuous clutch surface arranged in said housing, and a plurality of clutch members having a lower specific gravity than said liquid disposed between the clutch surface of said driven member and the periphery of said housing, means associated with said clutch members and said housing for causing rotation of said clutch members with said housing while permitting radial movement of said clutch members, the rotation of said driving member at a sufficient speed to centrifugally throw the liquid to the periphery of the housing being effective in causing said liquid to buoyantly move said clutch members radially into engagement with said clutch surface with a force depending upon the rotative speed of said driving member and the depth to which the clutch members are immersed in said liquid.

14. A clutch comprising a driving member including a rotatable housing containing a liquid, a driven member rotatable independently of said driving member when said housing is at rest and having a clutch surface arranged in said housing, a plurality of radially movable clutch members having a lower specific gravity than said liquid, means for maintaining said clutch members in inoperative relationship to said clutch surface when said housing is at rest, whereby the driven member may be freely rotated independently of the driving member, and means associated with said clutch members and said housing for causing rotation of said clutch members with said housing, the rotation of said driving member at a sufficient speed to centrifugally throw the liquid to the periphery of the housing being effective in causing said liquid to buoyant move said clutch members radially inwardly into engagement with said clutch surface with a force depending upon the speed of rotation of said driving member and the depth to which the clutch members are immersed in said liquid.

15. A clutch comprising a driving member including a rotatable housing containing a liquid, a driven member extending loosely through an opening in said housing and having an annular clutch surface arranged in said housing, a plurality of clutch members having a lower specific gravity than said liquid disposed between the clutch surface of said driven member and the inner periphery of said housing, means for causing rotation of said clutch members with one of said members while permitting radial movement of said clutch members, the rotation of said driving member at a sufficient speed to centrifugally throw the liquid to the inner periphery of the housing being effective in causing said liquid to buoyantly move said clutch members radially into engagement with said clutch surface and the ends of said clutch surface being spaced from the walls of said housing to permit misalinement of said driven member.

16. A clutch comprising a driving member including a rotatable housing containing a liquid, said housing having a peripheral portion and an enlarged body portion, a driven member extending loosely through an opening in said housing and having an annular clutch surface in said body portion arranged radially inwardly a short distance from the peripheral chamber and being adapted to form with the walls of the peripheral portion a substantially closed chamber, a plurality of clutch members having a lower specific gravity than said liquid arranged in the peripheral chamber, said clutch members being radially movable but otherwise substantially filling the peripheral chamber, and means associated with said clutch members and said housing for causing rotation of said clutch members with said housing while permitting radial movement of said clutch members, the rotation of said driving member at a sufficient speed to centrifugally throw the liquid to the inner periphery of the housing being effective in causing said liquid to buoyantly move said clutch members radially into engagement with said clutch surface with a force depending upon the rotative speed of said driving member and the depth to which the clutch members are immersed in said liquid, and the end portions of said clutch surface being spaced from the walls of the enlarged chamber to permit misalinement of said driven member.

17. A clutch comprising a driving member including a rotatable housing containing a liquid which is adapted to be thrown outwardly by centrifugal force during the rotation of said housing, a driven member having an annular clutch surface arranged in said housing, a plurality of clutch members having a lower specific gravity than said liquid disposed between the periphery of said housing and said clutch surface, means associated with said clutch members and said housing for causing rotation of said clutch members with said housing while permitting radial movement of said clutch members, the rotation of said driving member at a sufficient speed to centrifugally throw the liquid to the inner periphery of the housing being effective in causing said liquid to buoyantly move said clutch members radially into engagement with said clutch surface with a force depending upon the rotative speed of said driving member and the depth to which the clutch members are immersed in said liquid, and shedding means attached to the side walls of said housing and arranged radially inwardly of said clutch surface for receiving the liquid and draining it to the bottom of said housing as the driving member comes to rest.

18. A clutch comprising a driving member including a rotatable housing containing a liquid, a driven member having a clutch surface arranged within said housing, a plurality of clutch members having a lower specific gravity than said liquid disposed between the clutch surface of said driven member and the periphery of said housing, means associated with said clutch members and said housing for causing rotation of said clutch members with said housing while permitting radial movement of the clutch members, the buoyant action of said liquid being adapted upon rotation of said driving member to exert a radially inward force upon said clutch members, means for counteracting a portion of the buoyant force of said liquid, and said driven member being rotatable independently of said driving member until the driving member attains sufficient speed to force said clutch members into engagement with said clutch surface.

19. A clutch comprising a driving member including a rotatable housing containing mercury, a driven member having a clutch surface arranged in said housing, a plurality of clutch members disposed between the clutch surface of said driven member and the inner periphery of said housing and having buoyant contact with the mercury during the rotation of said housing, means associated with said clutch members and said housing for causing rotation of said clutch members with said housing while permitting radial movement of the clutch members, the rotation of said driving member at a sufficient speed to centrifugally throw the mercury to the inner periphery of the housing being effective in causing the mercury to buoyantly move said clutch members radially into engagement with said clutch surface with a force dependent upon the rotative speed of said driving member and the depth to which the clutch members are immersed in said mercury.

20. A clutch comprising a driving member including a rotatable housing containing mercury, a driven member rotatable independently of said driving member when said housing is at rest and having a clutch surface arranged in said housing, a plurality of clutch members disposed between the clutch surface and the inner periphery of said housing and having buoyant contact with the mercury during the rotation of said housing, the rotation of said driving member at a sufficient speed to centrifugally throw the mercury to the inner periphery of the housing being effective in causing said mercury to buoyantly move said clutch members radially into engagement with said clutch surface with a force dependent upon the rotative speed of said driving member and the depth to which the clutch members are immersed in said mercury.

21. A clutch comprising a driving member including a rotatable housing containing mercury, a driven member extending loosely through an opening in said housing and having a clutch surface, a plurality of clutch members disposed between the clutch surface of said driven member and the inner periphery of said housing and having buoyant contact with the mercury during the rotation of said housing, means associated with said clutch members and said housing for causing rotation of said clutch members with said housing while permitting radial movement of the clutch members, the rotation of said driving member at a sufficient speed to centrifugally throw the mercury to the inner periphery of the housing being effective in causing the mercury to buoyantly move said clutch members radially into engagement with said clutch surface with a force dependent upon the rotative speed of said driving member and the depth to which the clutch members are immersed in said mercury, and the end portions of the clutch surface of said driven member being spaced from the walls of said housing to permit misalinement of said driven member.

EVERARD F. KOHL.